United States Patent [19]
Houston

[11] Patent Number: 5,694,260
[45] Date of Patent: Dec. 2, 1997

[54] VIDEO VISUAL EFFECTS GENERATOR

[76] Inventor: Christopher M. Houston, 17384 Via Chiquita, San Lorenzo, Calif. 94580

[21] Appl. No.: 570,296

[22] Filed: Dec. 11, 1995

[51] Int. Cl.$^6$ .............................. G02B 5/08; G02B 27/24; G02B 27/22
[52] U.S. Cl. .......................... 359/850; 359/856; 359/857; 359/860; 359/861; 359/471; 359/472; 359/473
[58] Field of Search .................................. 359/850, 856, 359/857, 860, 861, 471, 472, 473, 478, 479; 348/143, 185, 739, 42

[56] References Cited

U.S. PATENT DOCUMENTS

| | | | |
|---|---|---|---|
| 4,623,223 | 11/1986 | Kempf | 359/472 |
| 4,720,184 | 1/1988 | Watson | 359/860 |
| 5,126,878 | 6/1992 | Trumbell et al. | 359/472 |
| 5,311,357 | 5/1994 | Summer et al. | 359/479 |
| 5,341,168 | 8/1994 | Hernandez | 348/42 |
| 5,357,369 | 10/1994 | Pillings et al. | 359/471 |
| 5,392,161 | 2/1995 | Wedev et al. | 359/861 |
| 5,430,578 | 7/1995 | Reagan | 359/856 |
| 5,517,355 | 5/1996 | Sullivan et al. | 359/471 |

FOREIGN PATENT DOCUMENTS 94020867  9/1994  WIPO ................................ 359/856

*Primary Examiner*—Paul M. Dzierzynski
*Assistant Examiner*—Mohammad Y. Sikder
*Attorney, Agent, or Firm*—Harris Zimmerman

[57] ABSTRACT

A visual effects generator for use with the image output of a video screen provides multiple secondary images and reflections dispersed through a wide visual field, so that the impact of the color and motion of the original image is enhanced. The generator includes a closed housing having a rear panel with an opening secured about the video screen. The housing includes a pair of lobes diverging laterally from the rear panel, with a viewing port disposed in the distal portion of each lobe. Each viewing port may be provided with a detachable hood to shield ambient light, and a closure panel may be secured to occlude either viewing port. A first pair of generally rectangular, planar mirrors are disposed within the housing, the mirrors abutting at confronting edges which are spaced apart from the center of the television screen, and the mirrors diverge obliquely forwardly from the screen. A second pair of rectangular plane mirrors are disposed within the housing, each second mirror having one edge joined to a respective edge of the rear panel and diverging laterally outwardly therefrom. A pair of transparent rectangular panels are arrayed with confronting edges disposed to impinge on the abutting edges of the first pair of mirrors. The opposite edges of the transparent panels are secured to the laterally opposed edges of the rear panel. Each lobe of the housing encompasses a first mirror and a second mirror in non-parallel, confronting relationship, with one transparent panel extending between the first and second mirrors.

20 Claims, 4 Drawing Sheets

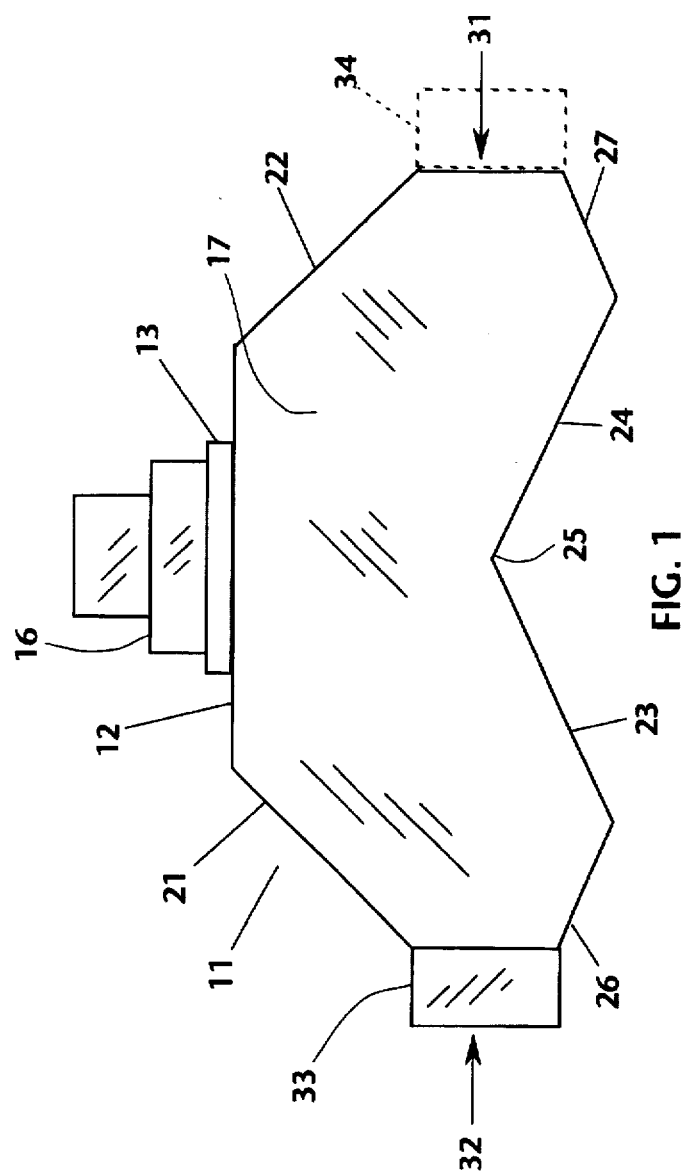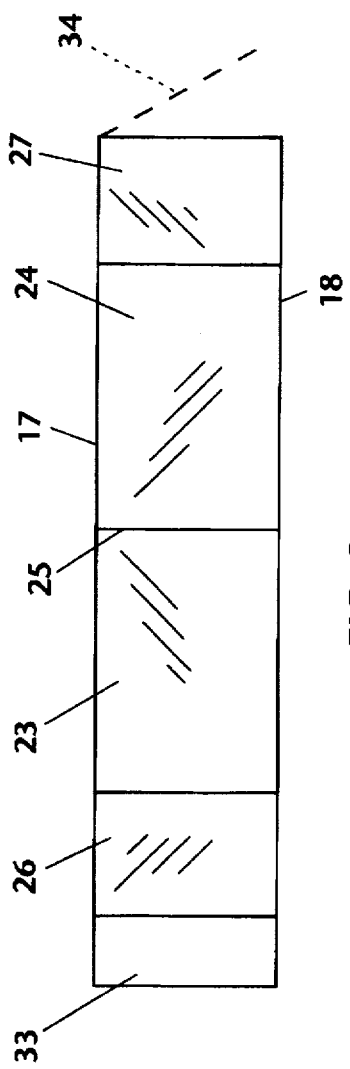

VIDEO VISUAL EFFECTS GENERATOR

BACKGROUND OF THE INVENTION

The present invention is in the general field of visual effects generators, and relates more particularly to visual effects generators used in conjunction with television and video displays.

Following the advent of television and video displays, industrialized societies are quickly being transformed from dependence on print media to a video culture. When television was a new invention, and moving images were presented in a small format in black and white with poor resolution, the public was amazed and awed by this achievement. Later, as color television became available and inexpensive, black and white video images lost their appeal and the public was again amazed by color technology. In the past decade or so, color television has saturated the consciousness of the public, in that color television images can be found, and indeed cannot be avoided, at virtually every restaurant and bar, airport, public building, library, and the like. What was very recently a great new invention has become in many uses more like moving wallpaper or a background furnishing, and the impact of video images has diminished as a result.

When television, and particularly color television was first introduced, many commentators predicted the inevitable demise of the motion picture industry. Contrary to these predictions, the film industry has thrived. One likely explanation for this unforeseen development is the ability of a large theater screen to deliver an image that is greater in scope and impact than the average television screen. Even "home theater" television products cannot provide the wide angle image of a movie theater, unless the viewer is positioned so close to the screen that the raster or pixels become a visual distraction. Thus it is clear that a wide field image is clearly an advantage that television does not provide.

A relatively recent innovation in video entertainment is the introduction of interactive game systems connected to a television display. These games typically do not provide high quality images, but rely instead on fast action and the use of color, motion and sound to hold the players attention. These systems may benefit from a large format image, since high resolution is not required, but the great majority of video game players do not have access to large screen televisions.

SUMMARY OF THE INVENTION

The present invention generally comprises a visual effect generator adapted for use with the image output of any television screen or video display. A significant aspect of the invention is that it provides multiple secondary images and reflections dispersed through a wide visual field, so that the impact of the color and motion of the original image is enhanced.

The visual effect generator includes a closed housing having a rear panel with an opening dimensioned to be secured about the screen of a television or video monitor. The housing includes a pair of lobes diverging laterally from the rear panel, with a viewing port disposed in the distal portion of each lobe. Each viewing port may be provided with a detachable hood to shield ambient light, and a closure panel may be secured to close either viewing port.

The housing includes paired upper and lower panels extending generally orthogonally to the rear panel. A first pair of mirrors are disposed within the housing, comprising generally rectangular, planar mirrors extending perpendicularly between the upper and lower panels. The mirrors are abutted at confronting edges which are spaced apart from the center of the television screen, and the mirrors diverge obliquely away from the screen. A second pair of rectangular plane mirrors are disposed within the housing, extending perpendicularly between the upper and lower panels. The second mirrors are arrayed in spaced apart relationship, each second mirror having one edge joined to a respective edge of the rear panel and diverging laterally outwardly therefrom.

Also secured within the housing are a pair of transparent panels, likewise extending orthogonally between the upper and lower panels. The transparent panels are also rectangular, and are arrayed with confronting edges disposed to impinge on the abutting edges of the first pair of mirrors. The opposite edges of the transparent panels are secured to the laterally opposed edges of the rear panel. Thus each lobe of the housing encompasses a first mirror and a second mirror in non-parallel, confronting relationship, with one transparent panel extending between the first and second mirrors.

The view from either viewing port includes four images. The primary image from video screen is directly visible, and a secondary enantiomorphic screen image is provided by the first mirror adjacent to the viewing port. A third screen image is provided by multiple reflection from the first and second mirrors of the opposed lobe, and a further image is reflected from the opposed transparent panel as a ghost image that partially overlaps the third image. The ghost image appears in the foreground, with the third image in the background, to simulate a three-dimensional depth effect.

In addition, the interior surfaces of the upper and lower panels and the rear panel may be provided with high reflectance film or coating to create subordinate reflections of the four images. The result is a wide field of view that is filled with images and reflected light. The visual effects multiply the color and motion of the screen image and enhances the viewing experience. The overall effect of the device is most striking when used in conjunction with video games displayed on the screen.

BRIEF DESCRIPTION OF THE DRAWING

FIG. 1 is a plan view of the video visual effects generator of the present invention.

FIG. 2 is a front elevation of the video visual effects generator depicted in FIG. 1.

DESCRIPTION OF THE PREFERRED EMBODIMENT

Figure 4:
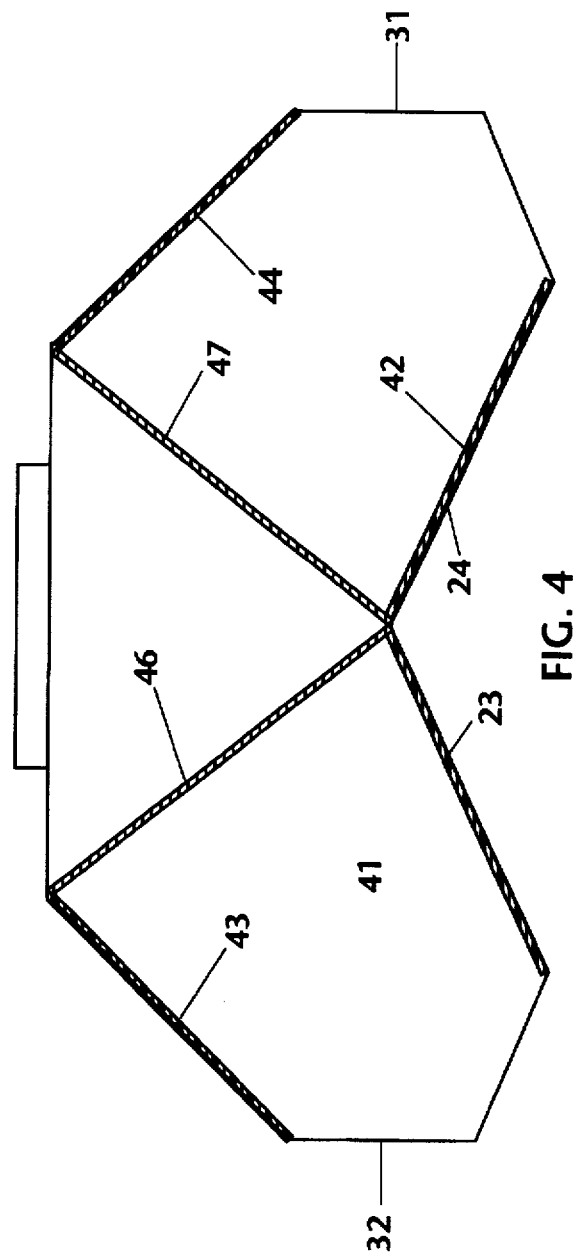
FIG. 4 is a cross-sectional plan view of the video visual effects generator depicted in FIGS. 1–3.
Figure 3:
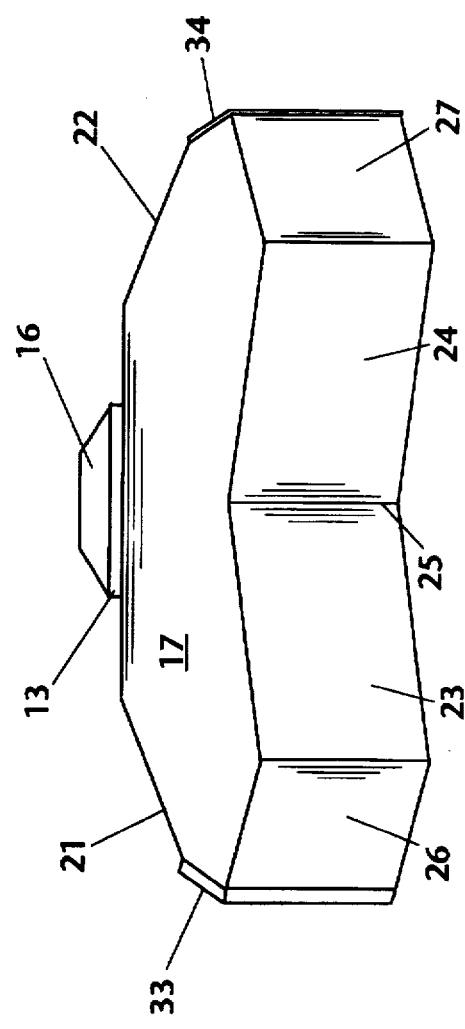
FIG. 3 is a front perspective view of the video visual effects generator depicted in FIGS. 1 and 2.

The present invention generally comprises a visual effects generator adapted for use with the image output of any television screen or video display. With regard to FIGS. 1–6, the visual effect generator includes a closed housing 11 having a rear panel 12. Disposed medially in the rear panel 12 is an adapter frame 13 which defines an image input window 14. The frame 13 is dimensioned to be received about the video screen of a television or video monitor 16 in a generally light-proof manner. Various frames 13 may be provided to accommodate typical video screen sizes.

Extending orthogonally from the rear panel 12 are paired upper and lower panels 17 and 18. The panels 17 and 18 are provided with plan configurations of a broad, modified W shape. A pair of rectangular side panels 21 and 22 project laterally outwardly and forwardly from the rear panel, and extend between the upper and lower panels 17 and 18. In the preferred embodiment the panels 21 and 22 describe an angle of approximately 45° to the rear panel and the video screen. A pair of rectangular front panels 23 and 24 extend between the upper and lower panels and are disposed in confronting relationship to the side panels 21 and 22, respectively. The panels 23 and 24 have confronting edges abutting along a common vertex 25 which is generally disposed to intersect the visual axis of the opening 14. The panels 23 and 24 define an angle of approximately 25° to the rear panel 12. In addition, a pair of wing panels 26 and 27 extend from laterally outwardly opposed edges of the front panels 23 and 24.

A pair of viewing windows 31 and 32 are defined by the opposed edges of the top and bottom panels 17 and 18, and the wing panel 27 and side panel 22, and the wing panel 26 and side panel 21, respectively. At least one viewing hood 33 is provided to circumscribe the viewing window and shield ambient light from entering the housing therethrough. In addition, a removable closure panel 34 is provided to occlude either of the viewing windows when not in use. Thus ambient light is substantially excluded from the closed interior of the housing 11 so that the image light from the video source 16 provides the only interior illumination for the housing.

In a preferred embodiment, the overall width (end to end) of the housing is approximately four feet, and the depth (from rear panel to front panels) is approximately two feet. The height of the housing (top panel to bottom panel) is approximately the height of the video screen to which the video effects generator is secured. The housing may be supported by a ground-engaging support disposed directly in front of the video screen.

A first pair of mirrors 41 and 42 are disposed within the housing, comprising generally rectangular, planar mirrors extending perpendicularly between the upper and lower panels. The mirrors 41 and 42 are secured to the inner surfaces of housing panels 23 and 24, respectively, and occupy substantially the entire interior surfaces thereof. Thus the mirrors 41 and 42 are abutted at confronting edges along the vertex 25, and the mirrors diverge obliquely away from the screen. That is, their reflective surfaces define an included angle greater than 180°.

A second pair of rectangular plane mirrors 43 and 44 are disposed within the housing, extending perpendicularly between the upper and lower panels. The mirrors 43 and 44 are secured to the inner surfaces of housing panels 21 and 22, respectively, and occupy substantially the entire interior surfaces thereof. Thus the mirrors 43 and 44 are disposed in confronting, non-parallel relationship to mirrors 41 and 42, respectively.

Also secured within the housing are a pair of transparent panels 46 and 47, likewise extending orthogonally between the upper and lower panels. The panels 46 and 47 have confronting edges abutting along the vertex 25, and diverge obliquely with opposed edges each secured to the junction of side panels 21 and 22, respectively, with the rear panel. Thus all image forming rays from the video screen necessarily pass through the panels 46 and 47, creating partial internal reflections.

Figure 7:
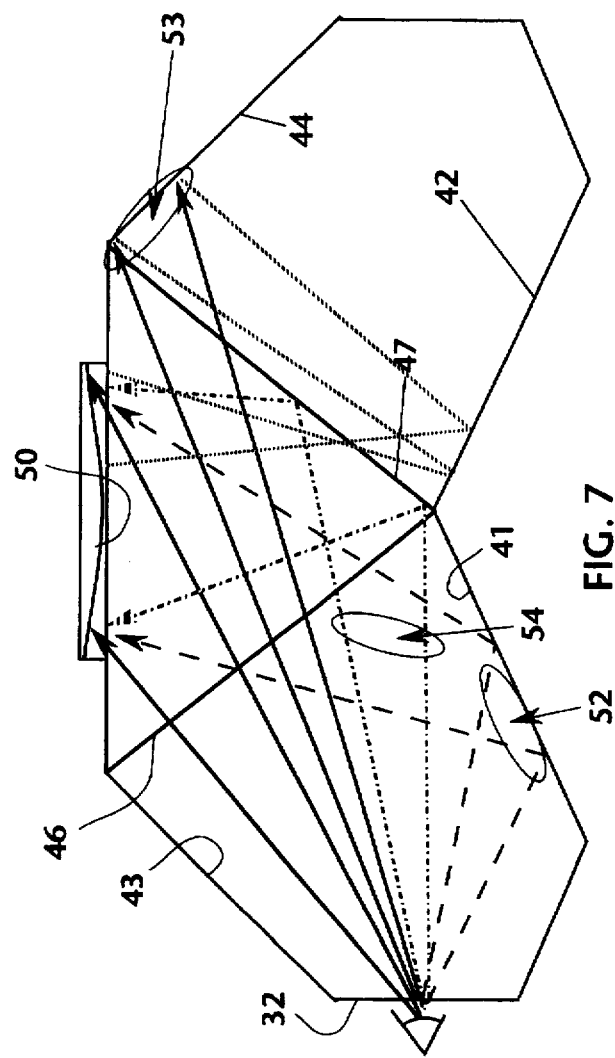
FIG. 7 is a schematic representation, of the image forming function of the video visual effects generator of the invention.
Figure 6:
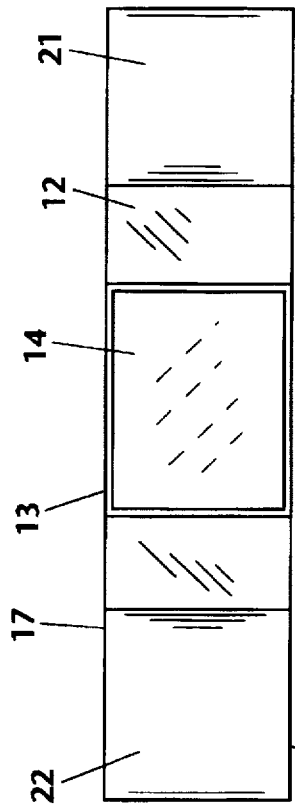
FIG. 6 is a rear elevation of the video visual effects generator depicted in FIGS. 1–5.
Figure 5:
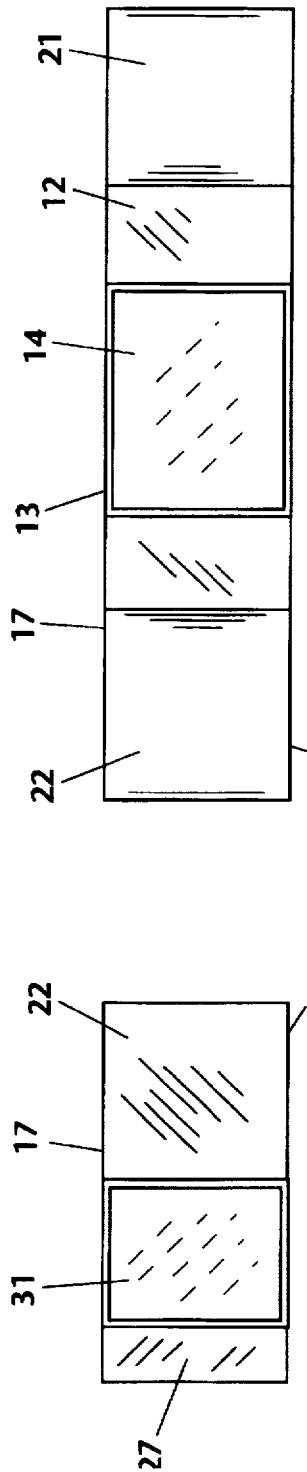
FIG. 5 is an end elevation of the video visual effects generator depicted in FIGS. 1–4.
Figure 8:
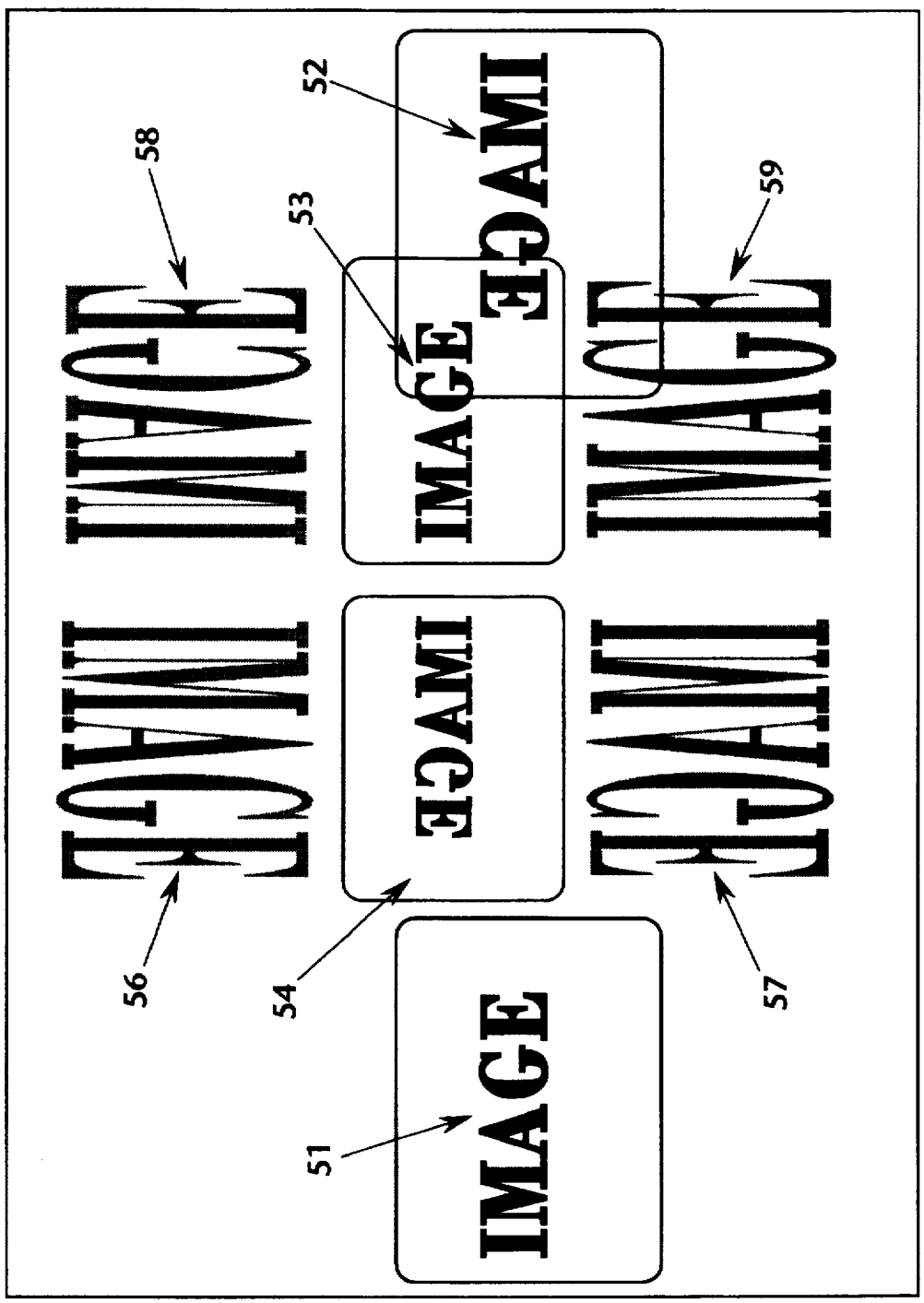
FIG. 8 is a depiction of the images seen through either of the viewing ports of the video visual effects generator.

The visual effects created by the invention comprise primarily a plurality of reflected images derived from the video screen image. Due to the bilateral symmetry of the housing and the arrangement of mirrors and transparent panels, the view from either viewing window 31 and 32 includes identical image content in enantiomorphic relationship. With regard to FIGS. 7 and 8, the primary image 51 from the video screen 50 is clearly visible. In addition, the video screen is reflected from the mirror 41 to the viewing port, providing a laterally reversed video image 52. Furthermore, an image 53 is formed by multiple reflection of the video picture from mirror 42 to mirror 44, and thence to the viewer. This image is not reversed, due to the multiple reflective path. Also, another image 54 is created by internal reflection of the video picture from the transparent panel 47, resulting in a laterally reversed image. Due to the dynamic nature of a typical video presentation, these four images multiply the color and motion of the original picture, resulting in a wide view that is filled with movement and color.

In addition, the interior surfaces of the upper and lower panels and the rear panel may be provided with a high reflectance film or coating. Image 54 is reflected from the top and bottom panels to create subordinate reflections 56 and 57, and image 53 is likewise reflected to create subordinate reflections 58 and 59. The subordinate images are not resolvable as such, but they significantly add to the desired effect of filling the view with colorful and active visual elements.

The visual effects provided by the invention is particularly advantageous when the video material comprises interactive games and the like. However, any video program may be enhanced by the device.

The housing may be formed preferably of panels fabricated of corrugated card stock, although plastic or resin, metal, or the like may be used. The construction of the housing is simple and inexpensive, and the apparatus may be produced, shipped, and sold as a knock-down unit that is assembled by the user. The placement and orientation of the panels of the housing determines the angular relationship of the mirrors and transparent panels, so that alignment of the optical elements is obtained merely by proper assembly of the housing panels. In this regard, the peripheral configuration of the top and bottom panels provides an accurate template for the proper assembly of all the panels disposed therebetween. The numerical angular relationships given herein are by way of example only, and other angular arrangements of the optical elements may be used to produce the multiple images described.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

I claim:

1. A visual effects generator for use with a video display screen, including:
   a closed housing having an image input window adapted to receive the video display screen;
   said housing including a pair of lobes extending laterally outwardly in opposed relationship from said image input window;
   optical means within said housing for producing a plurality of reflected images of said video display screen; and,
   a pair of viewing ports adapted to permit visualization of said display screen and said reflected images of said video display screen;
   each of said lobes including one of said viewing ports, said viewing ports disposed in laterally opposed fashion and spatially separated to permit each of two separate individuals to observe through a respective viewing port and view said display screen and said reflected images.

2. The visual effects generator of claim 1, wherein said optical means includes a first pair of plane mirrors, said pair of mirrors having confronting edges disposed in abutting relationship, said confronting edges disposed in spaced apart relationship to a medial portion of the video display screen.

3. The visual effects generator of claim 2, wherein said first pair of plane mirrors include a first pair of reflective surfaces that define an included angle greater than 180.

4. The visual effects generator of claim 3, further including a second pair of plane mirrors, each of said second mirrors disposed in confronting, non-parallel relationship to one of said first pair of mirrors.

5. The visual effects generator of claim 4, wherein said second pair of plane mirrors are disposed in spaced apart relationship with said image input window disposed therebetween, said second pair of plane mirrors defining an included angle less than 180.

6. The visual effects generator of claim 5, further including a pair of transparent panels, said transparent panels having confronting edges disposed in abutting relationship, said transparent panel confronting edges disposed in spaced apart relationship to a medial portion of the video display screen.

7. The visual effects generator of claim 6, wherein said pair of transparent panels diverge laterally from said abutting, confronting edges, each of said pair of transparent panels extending to impinge on edge portions of a respective one of said second pair of plane mirrors.

8. A visual effects generator for use with a video display screen, including:
   a closed housing having a rear panel and an image input window adapted to receive the video display screen;
   paired top and bottom panels extending generally orthogonally from said rear panel in spaced apart relationship;
   a pair of side panels projecting laterally outwardly and forwardly from said rear panel between said upper and lower panels;
   a pair of front panels disposed in confronting, non-parallel relationship to said side panels, said front panels having confronting edges abutting along a common vertex disposed to intersect the visual axis of said image input window;
   optical means within said housing for producing a plurality of reflected images of said video display screen; and,
   a pair of viewing ports, each disposed between one of said front panels and the respective confronting side panel, said viewing ports disposed in laterally opposed fashion and spatially separated to permit visualization by each of two separate individuals through a respective viewing port of said video display screen and said reflected images of said video display screen.

9. The visual effects generator of claim 8, wherein said optical means includes a first pair of mirrors, each secured to the interior surface of one of said front panels, said first pair of mirrors having reflective surfaces that define an included angle greater than 180.

10. The visual effects generator of claim 9, wherein said optical means includes a second pair of mirrors, each secured to the interior surface of one of said side panels and disposed in confronting, non-parallel relationship to one of said first pair of mirrors.

11. The visual effects generator of claim 10, wherein said optical means includes a pair of transparent panels, said transparent panels having confronting edges abutting at said common vertex and each extending from said common vertex to the conjunction of one of said side panels with said rear panel.

12. The visual effects generator of claim 11, wherein said second pair of mirrors each include a reflective surface defining an angle of approximately 45 with said rear panel.

13. The visual effects generator of claim 12, wherein said reflective surface of each of said first pair of mirrors defines an angle of approximately 25 with said rear panel.

14. The visual effects generator of claim 13, wherein said pair of transparent panels define an included angle less than 90.

15. The visual effects generator of claim 11, wherein said optical means produces a first image at each viewing port, said first image comprising a reflection of said video display screen from the respective one of said first mirrors disposed adjacent to the viewing port.

16. The visual effects generator of claim 15, wherein said optical means produces a second image at each viewing port, said second image comprising a reflection of said video display screen from the confronting first and second mirrors disposed in non-adjacent relationship to the viewing port.

17. The visual effects generator of claim 16, wherein said optical means produces a third image at each viewing port, said third image comprising a reflection of said video display screen from the transparent panel disposed in confronting, non-adjacent relationship to the viewing port.

18. A visual effects generator for use with a video display screen, including:
   a closed housing having an image input window adapted to receive the video display screen;
   said housing including a pair of enantiomorphic lobes extending laterally outwardly from said image input window;
   optical means within said housing for producing a plurality of reflected images of said video display screen;
   each of said lobes including a viewing port adapted to permit visualization of said display screen and said reflected images of said video display screen;
   said optical means including a first pair of plane mirrors, said pair of mirrors having confronting edges disposed in abutting relationship, said confronting edges disposed in spaced apart relationship to a medial portion of the video display screen;
   said first pair of plane mirrors including a first pair of reflective surfaces that define an included angle greater than 180°;

a second pair of plane mirrors, each of said second mirrors disposed in confronting, non-parallel relationship to one of said first pair of mirrors';

said second pair of plane mirrors being disposed in spaced apart relationship with said image input window disposed therebetween, said second pair of plane mirrors defining an included angle less than 180°;

a pair of transparent panels, said transparent panels having confronting edges disposed in abutting relationship, said transparent panel confronting edges disposed in spaced apart relationship to a medial portion of the video display screen;

said pair of transparent panels diverging laterally from said abutting, confronting edges, each of said pair of transparent panels extending to impinge on edge portions of a respective one of said second pair of plane mirrors;

each of said viewing ports being disposed between one of said first pair of plane mirrors and a confronting one of said second pair of plane mirrors and directed toward one of said pair of transparent panels extending therebetween.

19. A visual effects generator for use with a video display screen, including:

a closed housing having a rear panel and an image input window adapted to receive the video display screen;

paired top and bottom panels extending generally orthogonally from said rear panel in spaced apart relationship;

a pair of side panels projecting laterally outwardly and forwardly from said rear panel between said upper and lower panels;

a pair of front panels disposed in confronting, non-parallel relationship to said side panels, said front panels having confronting edges abutting along a common vertex disposed to intersect the visual axis of said image input window;

optical means within said housing for producing a plurality of reflected images of said video display screen;

a pair of viewing ports, each disposed between one of said front panels and the respective confronting side panel, to permit visualization of said video display screen and said reflected images of said video display screen;

said optical means including a first pair of mirrors, each secured to the interior surface of one of said front panels, said first pair of mirrors having reflective surfaces that define an included angle greater than 180°;

said optical means including a second pair of mirrors, each secured to the interior surface of one of said side panels and disposed in confronting, non-parallel relationship to one of said first pair of mirrors;

said optical means including a pair of transparent panels, said transparent panels having confronting edges abutting at said common vertex and each extending from said common vertex to the conjunction of one of said side panels with said rear panel;

said optical means producing a first image at each viewing port, said first image comprising a reflection of said video display screen from the respective one of said first mirrors disposed adjacent to the viewing port;

said optical means producing a second image at each viewing port, said second image comprising a reflection of said video display screen from the confronting first and second mirrors disposed in non-adjacent relationship to the viewing port;

said optical means producing a third image at each viewing port, said third image comprising a reflection of said video display screen from the transparent panel disposed in confronting, non-adjacent relationship to the viewing port;

reflective surface means secured to the interior surfaces of said top and bottom panels and said rear panel to amplify said first, second, and third images.

20. The visual effects generator of claim 19, further including a closure panel for occluding one of said viewing ports.

* * * * *